United States Patent [19]
Cohnen et al.

[11] Patent Number: 4,948,634
[45] Date of Patent: Aug. 14, 1990

[54] PROCESS FOR TROUBLEFREE COATING OF HYDROPHOBIC MATERIALS WITH POLYURETHANES

[75] Inventors: Walther Cohnen, Cologne; Alexander Riebel, Leverkusen; Karl W. Schranz, Odenthal-Hahnenberg, all of Fed. Rep. of Germany

[73] Assignee: Miles Inc., Elkhart, Ind.

[21] Appl. No.: 355,920

[22] Filed: May 23, 1989

[30] Foreign Application Priority Data

May 28, 1988 [DE] Fed. Rep. of Germany ....... 3818162

[51] Int. Cl.$^5$ .............................................. B05D 3/00
[52] U.S. Cl. .................................... 427/302; 427/322; 427/412.1; 428/339
[58] Field of Search ..................... 427/302, 322, 412.1; 428/339

[56] References Cited

U.S. PATENT DOCUMENTS 4,395,461 7/1983 Ching .............................. 427/322 X
4,612,249 9/1986 Packer et al. .................... 427/322 X Primary Examiner—Michael Lusignan
Attorney, Agent, or Firm—Roger N. Coe

[57] ABSTRACT

The present invention relates to a process for trouble-free, i.e. flaw-free and uniform, coating of a support which can accept a large amount of electrostatic charge, such as, for example, polycarbonate foils, with a solution of fully reacted polyurethane in organic solvents, more precisely after prior coating of the polycarbonate foil with an organic solution of the sodium salt of polystyrenesulphonic acid.

2 Claims, No Drawings

PROCESS FOR TROUBLEFREE COATING OF HYDROPHOBIC MATERIALS WITH POLYURETHANES

The present invention relates to a process for trouble-free, i.e. flaw-free and uniform, coating of a support which can accept a large amount of electrostatic charge, such as, for example, polycarbonate foils, with a solution of fully reacted polyurethane in organic solvents, more precisely after prior coating of the polycarbonate foil with an organic solution of the sodium salt of polystyrenesulphonic acid.

It is known that materials such as, for example, plastics, foils, etc. can be protected against undesired electrostatic charge by coating them with a thin layer of a conductive substance.

These are usually hydrophilic ion-containing substances, so-called antistatics, which are capable of dissipating electrostatic charge so as to prevent interfering effects during handling or further processing of the materials.

Various patent specifications disclose antistatics of this type, where, in particular, the sodium salt of polystyrenesulphonic acid is described as an effective antistatic.

It is likewise known to ensure adhesion of a hydrophilic binder, such as, for example, gelatin, to a hydrophobic support, such as, for example, cellulose triacetate, by first applying a so-called adhesive layer to the hydrophobic support, this adhesive layer then serving as an adhesion promoter for the hydrophilic binder layer. Adhesive layers of this type usually comprise compounds or mixtures of compounds which contain both hydrophobic and hydrophilic components or groups, so that the surface of the hydrophobic support material takes on a varying degree of hydrophilic character after coating and thus becomes open to a further coating with a hydrophilic binder.

Good adhesion between a binder and a support material is accordingly achieved by matching the properties of the contact surfaces, superficial dissolution of the support material by the solvent used during the coating having an additional, favourable effect on the adhesive power.

It was accordingly to be expected that, on coating a hydrophobic polycarbonate foil with a solution of fully reacted polyurethane in dimethylformamide (DMF), excellent adhesion of the polyurethane to the polycarbonate foil can be obtained, and this without prior treatment of the polycarbonate foil. However, cloud-like casting defects occurred, which are apparently attributable to the presence of electrostatic charge.

Physical methods of eliminating the charge, such as, for example, ionization of the surface immediately before the casting roller, did not provide a remedy, probably since fresh charge is produced due to contact of the web with the casting roller.

Surprisingly, it has now been found that the casting defects can be eliminated by treating the polycarbonate surface with a methanol/acetone solution of polystyrene sulphonate.

The hydrophilic boundary layer produced in this way does not result in adhesion impairment on subsequent coating with polyurethane. Adhesion impairment would actually have been expected due to the contrasting properties of the boundary layer compared with the support foil and the coating.

This behaviour is particularly notable since the adhesive behaviour is not impaired even if the hydrophilic polystyrene sulphonate layer is increased from about 50 mg/m$^2$ to about 120 mg/m$^2$.

The storage behaviour of a polycarbonate foil coated with polystyrene sulphonate is excellent, and the antistatic action is long-term and can neither be wiped off nor washed off.

In general, an application rate of about 50 mg/m$^2$ is sufficient to achieve a reduction in the surface resistance of the polycarbonate from $>10^{13}$ to $<=10^9$. Increasing the application rate by more than twice improves the antistatic action as expected by about two powers of ten, but without adversely affecting the adhesion of the polyurethane to the polycarbonate foil.

The invention is described in greater detail below with reference to examples.

EXAMPLE 1

33 parts of a 13% strength, aqueous solution of Na polystyrene sulphonate are mixed with 2 parts of water and 53.2 parts of methanol with stirring, the mixture is degassed, and a previously prepared mixture of 600 parts of acetone and 312 parts of methanol is added over the course of 5 minutes with stirring.

EXAMPLE 2

The procedure as indicated under Example 1 is followed, but the 33 ml of 13% strength Na polystyrene sulphonate solution are replaced by only 17 ml.

EXAMPLE 3

The 33 ml of 13% strength Na polystyrene sulphonate solution, as indicated in Example 1, are now replaced by 66 ml.

EXAMPLE 4

A polycarbonate foil having a thickness of 140 microns (POKALON from Messrs. LONZA) was coated on one side in a suitable coating apparatus with a solution prepared in accordance with Example 1, and the coating was dried at 75° C. until all traces of solvent had been removed. The coating parameters were selected so that the dry amount of coating was about 60 mg/m$^2$.

A sample of the POKALON foil coated in this way was conditioned for 24 hours at 23° C. and a relative humidity of 50%, and the surface resistance was then measured.

Compared with an untreated foil (surface resistance was $>10^{13}$ Ohms), the surface resistance was $1 \times 10^9$ Ohms.

EXAMPLE 5

The procedure followed was as indicated under Example 4, but a solution prepared in accordance with Example 2 was used for the coating. With the coating parameters unchanged compared with Example 4, the dry application rate was now about 30 mg/m$^2$.

The surface resistance measured under identical conditions was $8 \times 10^{10}$.

EXAMPLE 6

A POKALON foil was coated as indicated under Example 4, but using a solution prepared in accordance with Example 3. Again with the coating parameters unchanged, the dry amount of coating was about 120 mg/m$^2$ and the surface resistance was $4.7 \times 10^7$ Ohms.

EXAMPLE 7

2870.5 parts of anhydrous dimethylformamide (DMF) are weighed out into a cooled stirred vessel equipped with a circulation dissolver from Messrs. Niemann, and a previously prepared mixture of 153 parts of DBS 75 (Messrs. Hüls) and 457 parts of anhydrous DMF are added with stirring at 450 rpm. After about 10 minutes, 1000 parts of a polyurethane which is soluble in organic solvents (for example DESMODERM KBH granules from Messrs. Bayer AG) are added at a stirrer speed of 500 rpm over the course of 4 minutes, and the stirrer speed is increased in steps to 2000 rpm over the course of 40 minutes.

The cooling of the stirred vessel is controlled during this process so that the internal temperature reaches about 60° C.

In order to achieve complete dissolution of the polyurethane, the mixture is subsequently stirred for a further 15 minutes at 1800 rpm, and the solution is filtered through a 100 micron filter.

The viscosity, measured at 30° C., can be between 2000 and 15,000 mPas.sec., depending on the type of polyurethane.

EXAMPLE 8

5337 parts of the polyurethane solution prepared in accordance with Example 7 are weighed out into a cooled stirred vessel equipped with a circulation dissolver from Messrs. Niemann.

568 parts of a 28% strength, cationic polyurethane dispersion (for example DESMODERM KPK dispersion from Messrs. Bayer AG) are added over the course of 4 minutes at a stirrer speed of 1500 rpm and at a temperature of 25° C., and the mixture is stirred for a further 1 minute.

If desired, a filler, such as, for example, barium sulphate (Blanc fixe-Micron from Messrs. Sachtleben) can then be added to the mixture at a stirrer speed of 2000 rpm and an addition rate of about 2 kg/minute, the stirrer speed being increased to 2600 rpm after rinsing off filler adhering to the wall surfaces using 34 parts of DMF.

The internal temperature can be allowed to increase to about 60° C. during subsequent stirring for 10 minutes at 2600 rpm.

A previously prepared mixture of 1137 parts of a 28% strength, cationic polyurethane dispersions (for example DESMODERM KBK dispersion from Messrs. Bayer AG) and 1170 parts of anhydrous DMF is then run in at 2400 rpm via an aperture of diameter 2.5 mm, and the mixture is then diluted with 2083 parts of DMF. After a stirring time of 10 minutes at 2000 rpm, a further 1185 parts of DMF are added over the course of 10 minutes at a stirrer speed of 1200 rpm, and the mixture is stirred for a further 5 minutes.

After cooling to $<=50°$ C., the solution obtained in this way is filtered through a 50 micron filter. The viscosity, measured at 30° C., is between 600 and 1500 mPas. sec.

EXAMPLE 9

With the aid of a suitable casting apparatus, the solution obtained in accordance with Example 8 is applied at a temperature of 30° C. to a polycarbonate foil obtained in accordance with Examples 4, 5 or 6, an extrusion caster expediently being used as is known for a very wide variety of applications. The wet film thickness to be applied and the casting rate can be varied within broad limits.

After casting, the web is passed through a water-bath in order to solidify the coating and to wash out the organic solvents, the water being replaced at a rate of about 1000 l/hour. The residence time of the web in the waterbath should not be less than 4 minutes.

After drying at 75° C., a uniform, cloud- and structure-free polyurethane layer which has excellent adhesion to the substrate is obtained on the polycarbonate foil.

EXAMPLE 10

The polycarbonate foil is used as indicated in Example 9 without pre-treatment (surface resistance $>10^{13}$), structuring occurs within the layer even during casting, and is retained after solidification and drying of the layer and thus render the product unusable.

What is claimed is:

1. Process for troublefree coating of hydrophobic supports with hydrophobic polyurethanes from organic solvents, characterized in that the support is pre-treated with an alcohol/acetone solution of polystyrene sulphonate before coating.

2. Process according to claim 1, in which the pre-treatment is carried out in a manner such that a polystyrene sulphonate layer of 50 mg/m$^2$ to 180 mg/m$^2$ is produced.

* * * * *